Nov. 9, 1943.   C. G. GERHOLD   2,333,856
TREATMENT OF HYDROCARBONS
Filed May 12, 1939
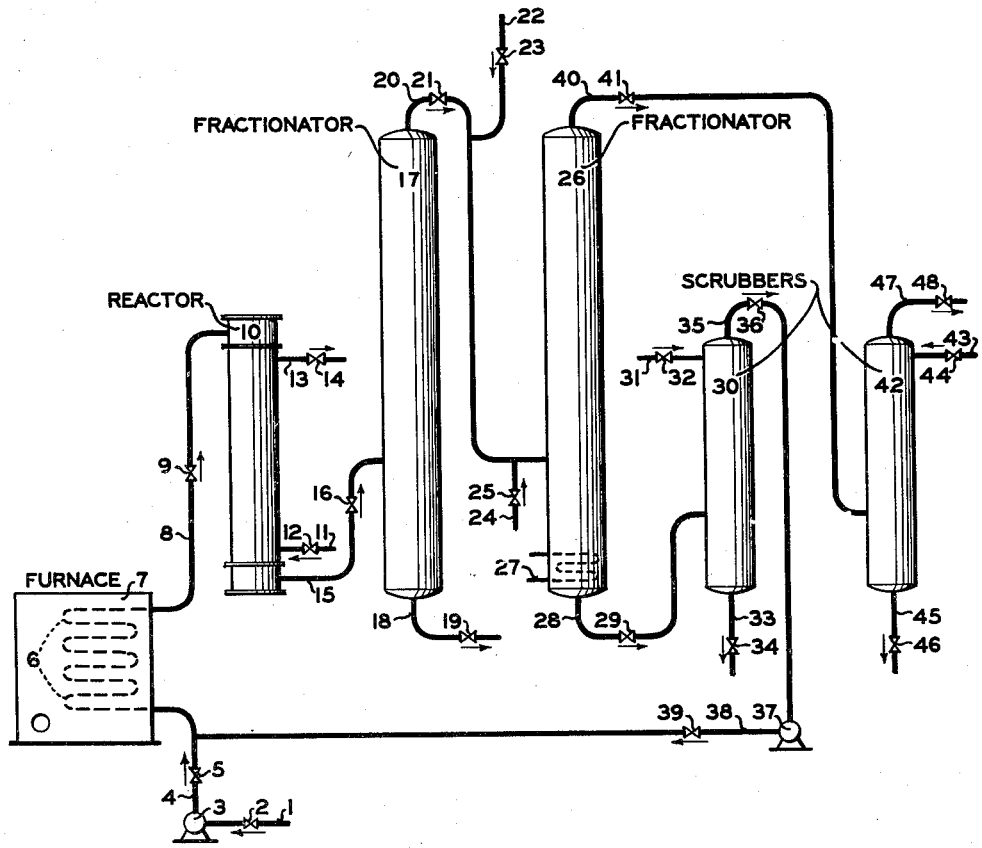
INVENTOR
CLARENCE G. GERHOLD
BY
ATTORNEY Patented Nov. 9, 1943

2,333,856

UNITED STATES PATENT OFFICE 2,333,856

TREATMENT OF HYDROCARBONS

Clarence G. Gerhold, Chicago, Ill., assignor to Universal Oil Products Company, Chicago, Ill., a corporation of Delaware Application May 12, 1939, Serial No. 273,229

1 Claim. (Cl. 202—42)

This invention relates to a process for separating normally gaseous olefinic and paraffinic hydrocarbons. More specifically, it is concerned with a process involving the conversion of normally gaseous olefinic hydrocarbons present in a relatively wide boiling range mixture of normally gaseous hydrocarbons into normally liquid polymers, wherein unconverted butenes are separated from the residual normally gaseous hydrocarbons in order that said unconverted butenes may be subjected to further polymerization treatment.

In one specific embodiment the invention comprises subjecting normally gaseous hydrocarbons to polymerization treatment to convert the olefinic hydrocarbons contained therein into normally liquid polymers, separating the residual normally gaseous hydrocarbons from the normally liquid polymers and recovering the latter as a product of the process, fractionally distilling said residual normally gaseous hydrocarbons in the presence of a separating agent capable of depressing the vaporization tendency of the butene hydrocarbon to a greater extent than its corresponding paraffinic hydrocarbon whereby to substantially separate a fraction consisting predominantly of butenes and a fraction consisting predominantly of butanes and lighter normally gaseous hydrocarbons, recovering the latter, after treatment for the removal of said separating agent, as a product of the process, treating said butene fraction for the removal of said separating agent and returning the recovered butene fraction to further polymerization treatment in commingled state with the normally gaseous hydrocarbons charged to the process.

In the various polymerization processes as they are now practiced it is not always possible to remove in one pass all of the polymerizable olefins. The loss of polymerizable olefins in the residual gases from the polymerization plant over a long period of time constitutes a considerable waste which may be avoided through the use of this process.

It has been found that normally gaseous hydrocarbons form azeotropic mixtures with sulfur dioxide and generally that the azeotropes of the paraffins have lower average boiling points than their corresponding olefinic azeotropes. This is apparently due to the fact that sulfur dioxide has a greater selective solvent action for the olefinic component of the mixture thereby depressing the vapor pressure of said olefinic component to a greater extent than the paraffinic component. Since the olefinic azeotropes have a higher boiling point than their corresponding paraffinic azeotropes of sulfur dioxide and since the azeotropes of the $C_3$ and lighter gaseous hydrocarbons boil below the $C_4$ azeotropes, a separation of a butene fraction from the butanes and lighter normally gaseous hydrocarbons, may be effected by fractional distillation. Furfural in addition to other compounds has also been found to possess the property of selectively depressing the vapor pressure of the olefinic component to a greater extent than its corresponding paraffinic component in a mixture of olefins and paraffins and may also be used as a separating agent in such fractionations.

The foregoing brief outline of the character and steps of the process will be amplified by describing a typical operation in connection with the attached drawing which shows diagrammatically by use of conventional figures generally in side elevation an arrangement in which the objects of the process may be accomplished. The units shown in the drawing are not to any exact or relative scale and are not intended to limit the scope of the invention.

Referring now to the drawing, the charging stock, which may comprise a wide boiling range mixture of normally gaseous hydrocarbons, is introduced through line 1 and valve 2 to pump 3, which discharges through line 4 and valve 5 into heating coil 6. The gaseous hydrocarbons in passing through heating coil 6 are raised to the desired polymerizing temperature by means of heat supplied from furnace 7 and are discharged therefrom through line 8 and valve 9 into reactor 10 containing polymerizing catalysts.

Among the preferred catalysts are precalcined mixtures of phosphoric acids and adsorbents, the latter preferably being of a siliceous character and comprising such materials as certain clays of the montmorillonite and bentonite type, (either raw or acid treated), kieselguhr, precipitated silica, and other siliceous and refractory materials. The catalysts may be prepared by making a paste, for example, of kieselguhr and a major portion by weight of ortho or pyrophosphoric acid, extruding or forming the pasty material and calcining at temperatures of approximately 570 to 750° F. and, if necessary, subjecting the calcined particles to the action of superheated steam at about 510° F. and an atmospheric pressure to bring the active catalytic acid to the state of hydration corresponding to maximum efficiency. Although this is the preferred catalyst, it is not to be considered as a limiting feature of the invention, for other catalysts, such as, for example, sulfuric acid, may be used within the broad scope of the invention.

The reactions of polymerization of olefins are exothermic, and in order to secure best results means must be provided for extracting evolved heat to prevent excessive temperature rise in the catalyst zone. The polymerizing catalyst is preferably contained in banks of tubes in suitably constructed reactors, such as reactor 10 shown in the diagrammatic drawing, the tubes being surrounded by a cooling medium, such as evaporating water. As shown in the accompanying diagrammatic drawing, water is introduced to the shell of reactor 10 through line 11 and valve 12 and the steam produced therein withdrawn from the upper portion of reactor 10 through line 13 and valve 14.

Although only one reactor is shown in the accompanying diagrammatic drawing, a plurality of reactors connected in series may be employed to obtain the desired contact time and otherwise connected so that the individual reactors may be segregated when the catalyst has become spent in order to replace such spent catalysts while employing other reactors in which the catalyst has sufficient activity to maintain operation.

The reaction products from reactor 10, consisting essentially of unreacted olefins, residual paraffins and liquid polymers, are directed from the lower portion thereof through line 15 and valve 16 to fractionator 17 wherein they are subjected to fractionation to separate the normally gaseous hydrocarbons from the normally liquid polymers. The normally liquid polymers, in the case here illustrated, are withdrawn from the lower portion of fractionator 17 through line 18 and valve 19 and, when desired, may be directed to cooling or storage or to further treatment or elsewhere as desired. The residual normally gaseous hydrocarbons are directed from the upper portion of fractionator 17 through line 20 and valve 21 and, in accordance with this invention, sulfur dioxide or furfural or similar agents which possess the same properties introduced through line 24 and valve 25 in excess of 10 mol per cent is commingled with the gaseous hydrocarbons in line 20 and the mixture introduced to fractionator 26. When desired, a normally gaseous hydrocarbon fraction containing a relatively small amount of polymerizable olefins may be introduced through line 22 and valve 23 into line 20 and commingled therein with the residual normally gaseous hydrocarbons separated in fractionator 17. The fraction introduced by way of line 22 may, when desired, constitute the sole charging stock for the process, but, it is not to be construed as being equivalent to the preferred process, which fact will be more or less apparent to those skilled in the art.

The mixture introduced to fractionator 26 is subsantially separated therein into a liquid fraction consisting predominantly of the azeotropic mixture of butenes and the separating agent, and into an overhead vaporous fraction consisting predominantly of the azeotropic mixture of butane and lighter normally gaseous hydrocarbons and the separating agent. Provision is made for reboiling in the lower portion of fractionator 26 by means of an external reboiler of the heat exchanger type or, as in the case here illustrated, by means of a suitable closed coil 27 through which a suitable heating medium is circulated in indirect heat exchange relationship with the surrounding liquid.

The butene azeotropic mixture collected in the lower portion of fractionator 26 is directed therefrom through line 28 and valve 29 into scrubber 30, which is preferably maintained at a sufficiently reduced pressure, relative to the pressure maintained in fractionator 26, that the mixture introduced thereto is substantially completely vaporized. The vaporized materials in their ascension in scrubber 30 are intimately contacted with a solvent, such as water, introduced by way of line 31 and valve 32 whereby the separating agent is dissolved from the ascending gases and is removed with the solvent from the lower portion of scrubber 30 through line 33 and valve 34.

The scrubbed butene fraction is directed from the upper portion of scrubber 30 through line 35 and valve 36 to a compressor 37, which discharges through line 38 and valve 39 into line 4 the butene fraction being commingled therein with the normally gaseous hydrocarbon introduced as charging stock for the process.

The overhead fraction from fractionator 26 is directed therefrom through line 40 and valve 41 into scrubber 42. The gaseous mixture in its upward passage in scrubber 42 is intimately contacted with a suitable solvent, such as water, introduced by way of line 43 and valve 44 whereby the separating agent is dissolved from the ascending gases and is removed with the solvent from the lower portion of scrubber 42 through line 45 and valve 46 and may be treated for the recovery of the separating agent or disposed of in any suitable manner. The scrubbed gases in scrubber 42, consisting predominantly of butane and lighter normally gaseous hydrocarbons, are directed from the upper portion thereof through line 47 and valve 48 to collection and storage or elsewhere as desired.

The preferred ranges of operating conditions which may be employed in a process such as illustrated and above described are approximately as follows:

The heating coil to which the charging stock is supplied may employ an outlet polymerizing temperature ranging, for example, 150 to 450° F. and a superatmospheric pressure in the range of 200 to 600 pounds or more per square inch. Substantially the same conditions of temperature and pressure may be employed in the communicating reactor. The fractionator to which the products from the polymerization reaction are supplied may employ a superatmospheric pressure ranging, for example, from 50 to 250 pounds or more per square inch. The gas fractionator may employ a superatmospheric pressure in the range of 40 to 300 pounds or more per square inch with a top temperature of from 80 to 200° F. The scrubbers may employ a substantially reduced pressure relative to that maintained in the gas fractionator.

An example of one specific operation of the process is approximately as follows:

The charging stock had the following composition:

| | Mol per cent |
|---|---|
| Hydrogen | 5.7 |
| Methane | 7.4 |
| Ethylene | 5.6 |
| Ethane | 4.3 |
| Propylene | 35.6 |
| Propane | 6.3 |
| Iso-butene | 13.0 |
| Normal butenes | 15.2 |
| Butanes | 6.9 |

The charging stock was heated to a temperature of approximately 275° F. and subjected to contact with a phosphoric acid-containing catalyst at a superatmospheric pressure of approximately 300 pounds per square inch. The products from the polymerization reaction were fractionated at a superatmospheric pressure of 200 pounds per square inch to separate the residual normally gaseous hydrocarbons from the normally liquid polymers. The normally liquid polymers condensed as reflux condensate in the fractionator were removed from the lower portion thereof and recovered as a product of the process. The normally gaseous hydrocarbons were withdrawn as an overhead product and were commingled with sulfur dioxide in the mol proportion of 1:1 and the mixture was subjected to fractionation at a superatmospheric pressure of 80 pounds per square inch. The overhead fraction, consisting predominantly of the azeotropes of butane and the lighter normally gaseous hydrocarbons and sulfur dioxide, was withdrawn at approximately 100° F. and scrubbed with water to remove the sulfur dioxide and the normally gaseous hydrocarbons recovered as a product of the process. The liquid fraction from the fractional distillation treatment, consisting predominantly of the azeotropes of the butenes, was scrubbed with water to remove sulfur dioxide and the butenes recovered therefrom were returned to the polymerization treatment. This operation yielded approximately 12 gallons of normally liquid polymer per 100 cubic feet of normally gaseous hydrocarbons charged to the process.

I claim as my invention:

A process for separating normally gaseous olefins from a mixture thereof with corresponding paraffins which comprises fractionating the mixture under pressure in the range of substantially 40 to 300 pounds per square inch in the presence of sufficient sulfur dioxide to form azeotropic mixtures with said olefins and said paraffins and at a temperature so chosen as to separate therefrom a liquid azeotropic mixture of olefins and sulfur dioxide, reducing the pressure on the azeotropic mixture sufficiently to vaporize the same, and scrubbing the vapors with water to separate the sulfur dioxide from the olefins.

CLARENCE G. GERHOLD.